United States Patent [19]

Kim

[11] Patent Number: 5,307,979
[45] Date of Patent: May 3, 1994

[54] APPARATUS FOR CARRYING OUT MIG WELDING ON THREE-DIMENSIONAL CURVED SURFACE, AND MILLING APPARATUS FOR AUTOMATICALLY FORMING WELDING GROOVES

[75] Inventor: Jong-Hee Kim, Kyungnam, Rep. of Korea

[73] Assignee: Hyundai Heavy Industries Co., Ltd., Kyungnam, Rep. of Korea

[21] Appl. No.: 978,962

[22] Filed: Nov. 20, 1992

[51] Int. Cl.⁵ .................. B23K 37/02; B23K 37/04; B23K 9/173
[52] U.S. Cl. ..................... 228/32; 219/74; 219/124.34; 219/126; 228/49.1
[58] Field of Search ............ 228/4.1, 5.1, 6.1, 27, 228/25, 32, 49.1; 219/124.1, 124.31, 124.34, 74, 125.1, 125.12, 126, 137.62, 158, 161

[56] References Cited

U.S. PATENT DOCUMENTS

| | | | |
|---|---|---|---|
| 3,128,368 | 4/1964 | Franz et al. | 219/125.12 |
| 4,133,470 | 1/1979 | Trail | 228/49.1 |
| 4,571,479 | 2/1986 | Maeda et al. | 219/124.34 |
| 4,750,663 | 6/1988 | Warczak | 219/124.34 |
| 4,939,339 | 7/1990 | Folkening et al. | 219/137.62 |

Primary Examiner—Kenneth J. Ramsey
Attorney, Agent, or Firm—Nikaido, Marmelstein, Murray & Oram

[57] ABSTRACT

An automatic welding apparatus and an automatic milling apparatus for machining welding grooves in order to weld a three-dimensional surface such as a ball tank or the like are disclosed. A welding wire spool is accommodated within a case and a cover to prevent the welding wire from being oxidized and from being contaminated with foreign materials. The automatic milling apparatus is installed to form welding grooves on the both sides of the objects to be welded, in the case where a welding is performed on a three-dimensional curved surface. A guide roller having a handle is installed to control the machining depth of the grooves, and an idling type nylon guide roller is installed in closed contact with the shaft of a cutter, thereby adjusting the distance between the rail and the groove, and adjusting the deviations of the depth of the grooves, which are caused by the machining inaccuracies due to the deviations of the three-dimensional curvature.

8 Claims, 11 Drawing Sheets

F I G. 12
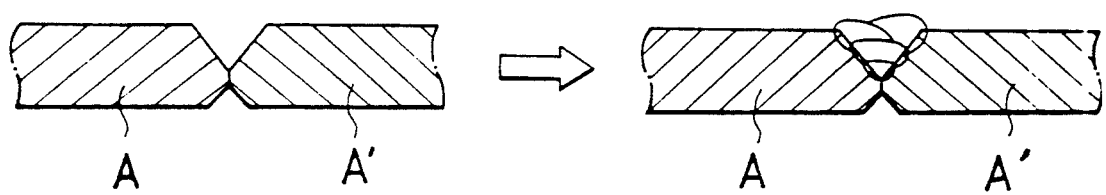
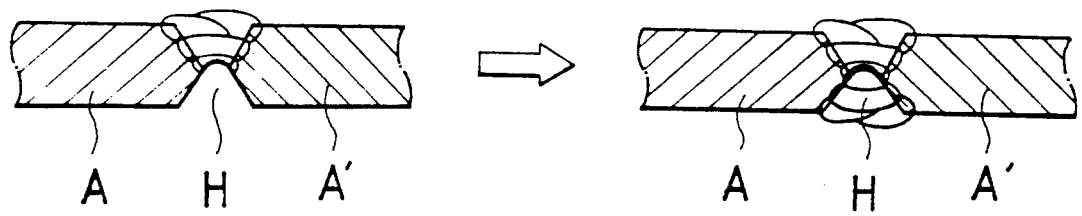

APPARATUS FOR CARRYING OUT MIG WELDING ON THREE-DIMENSIONAL CURVED SURFACE, AND MILLING APPARATUS FOR AUTOMATICALLY FORMING WELDING GROOVES

FIELD OF THE INVENTION

The present invention relates to an automatic welding apparatus for welding curved surfaces such as a ball tank and the like with a downward, upward and lateral welding postures along longitudinal and lateral welding lines. The present invention also relates to a welding wire protecting apparatus in which the welding wire is protected from being oxidized or from being contaminated by foreign materials by installing a case and a cover for the wire spool, and in which the formation of dew on the welding wire is prevented by installing a heater within the case. The present invention also relates to an automatic milling apparatus for machining welding grooves on a three-dimensional surface in order to weld the other side of the structure to be welded.

BACKGROUND OF THE INVENTION

When a curved surface of a three-dimensional structure such as an aluminum ball tank is automatically welded, welding grooves are formed on the front and rear faces of the object to be welded, and the frontal and rear grooves are welded up.

However, when the rear face is welded, the rear grooves are placed in an unfavorable form, and therefore, the welding bead is worsened, thereby deteriorating the mechanical strength of the welded portion.

Conventionally in the case of a curved portion such a ball tank, it is impossible to automatically access a welding torch to the object to be welded, and therefore, separate devices have to be used for the respective welding postures, while the welding with an upward posture has to be manually welded, thereby making it liable to cause accidents and other inconvenience.

The conventional wire spool for the automatic welding apparatus is exposed to the open air, and therefore, the welding wire is oxidized, or contaminated with foreign materials. Therefore, if the welding wire is left under the open air for a long time, blow holes are formed, with the result that welding defects are produced. Further, during winter seasons and raining seasons, and during seasons showing severe temperature differences, a dew formation is caused to aggravate the rate of welding defects.

SUMMARY OF THE INVENTION

The present invention is intended to overcome the above described disadvantages of the conventional techniques.

Therefore it is the object of the present invention to provide an automatic welding machine in which an automatic milling process is carried out on the rear face after welding the front face, thereby improving the welding quality for the rear face.

Further in the present invention, the welding wire spool is placed in a sealed case, and an electric heater is installed therewithin, so that the optimum temperature should be maintained, and that the moisture should be kept to the minimum.

BRIEF DESCRIPTION OF THE DRAWINGS

The above objects and other advantages of the present invention will become more apparent by describing in detail the preferred embodiment of the present invention with reference to the attached drawings in which:

FIG. 12 illustrates the welding process according to the present invention.

DESCRIPTION OF THE PREFERRED EMBODIMENT

Figure 1:
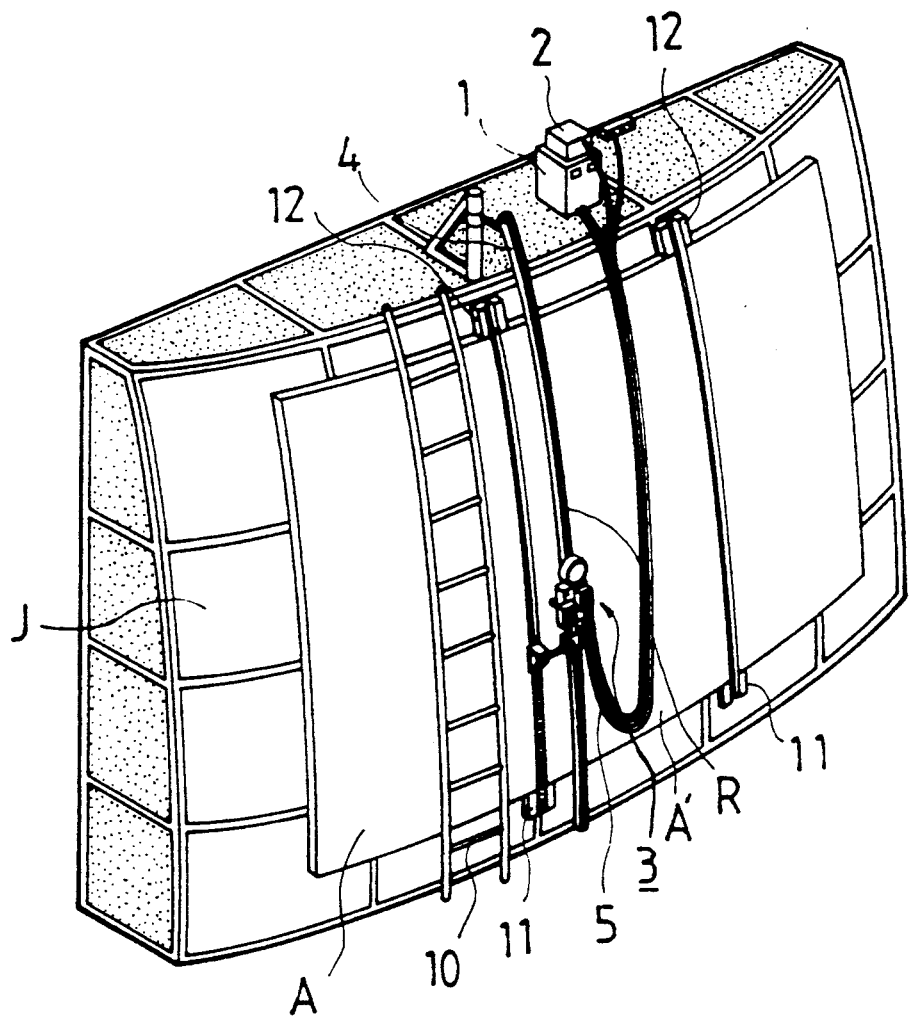
FIG. 1 is a perspective view showing the welding process of the welding apparatus according to the present invention.

As shown in FIG. 1, the welding apparatus of the present invention includes a welding power source 1, a cooling water pump 2, a carriage 3, a rail 4 with a simple rail or without a rack R, and various cables/hoses 5.

Figure 2:
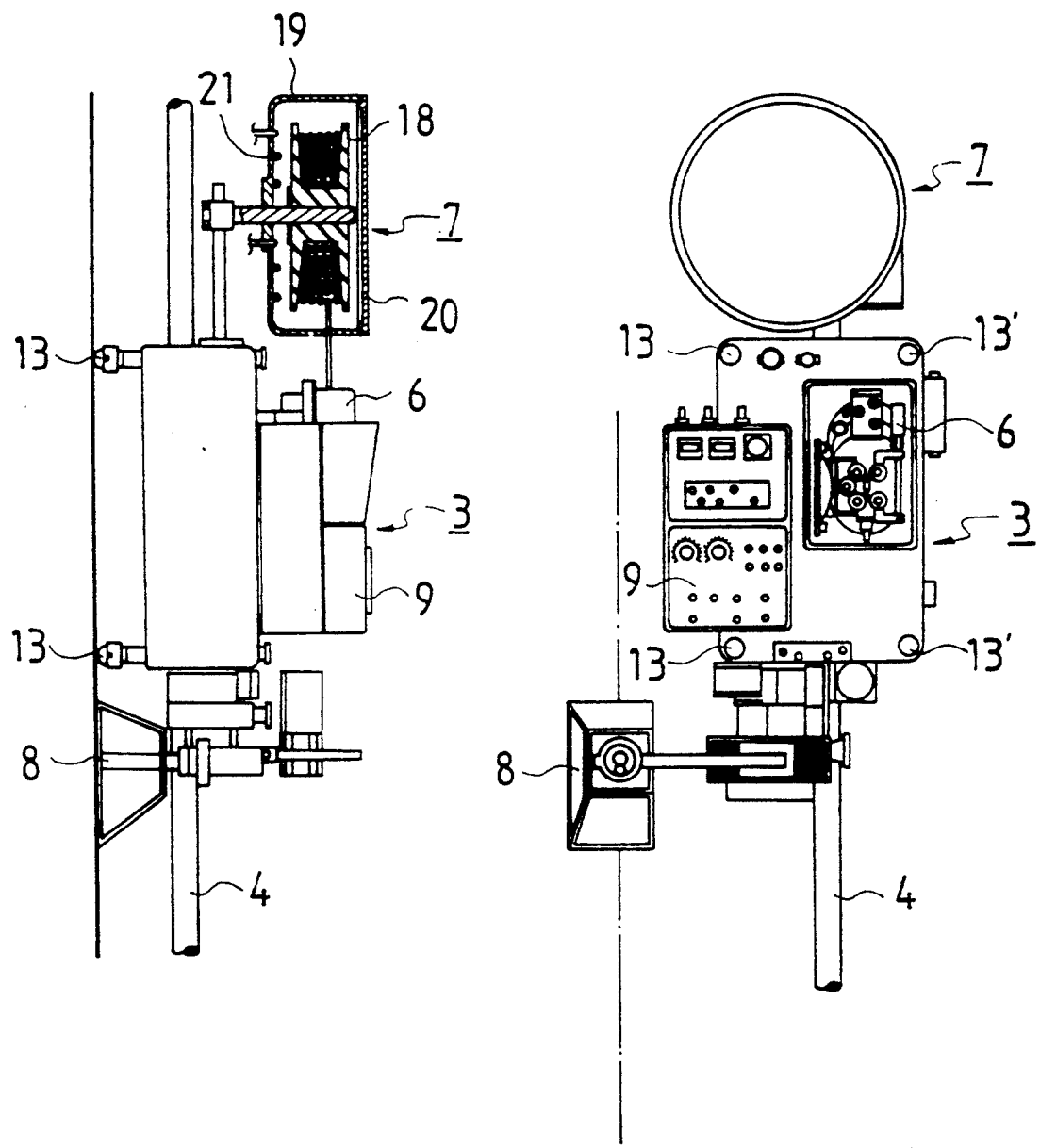
FIG. 2 is a partly sectional view of the carriage and the welding wire protecting device according to the present invention.
Figure 3:
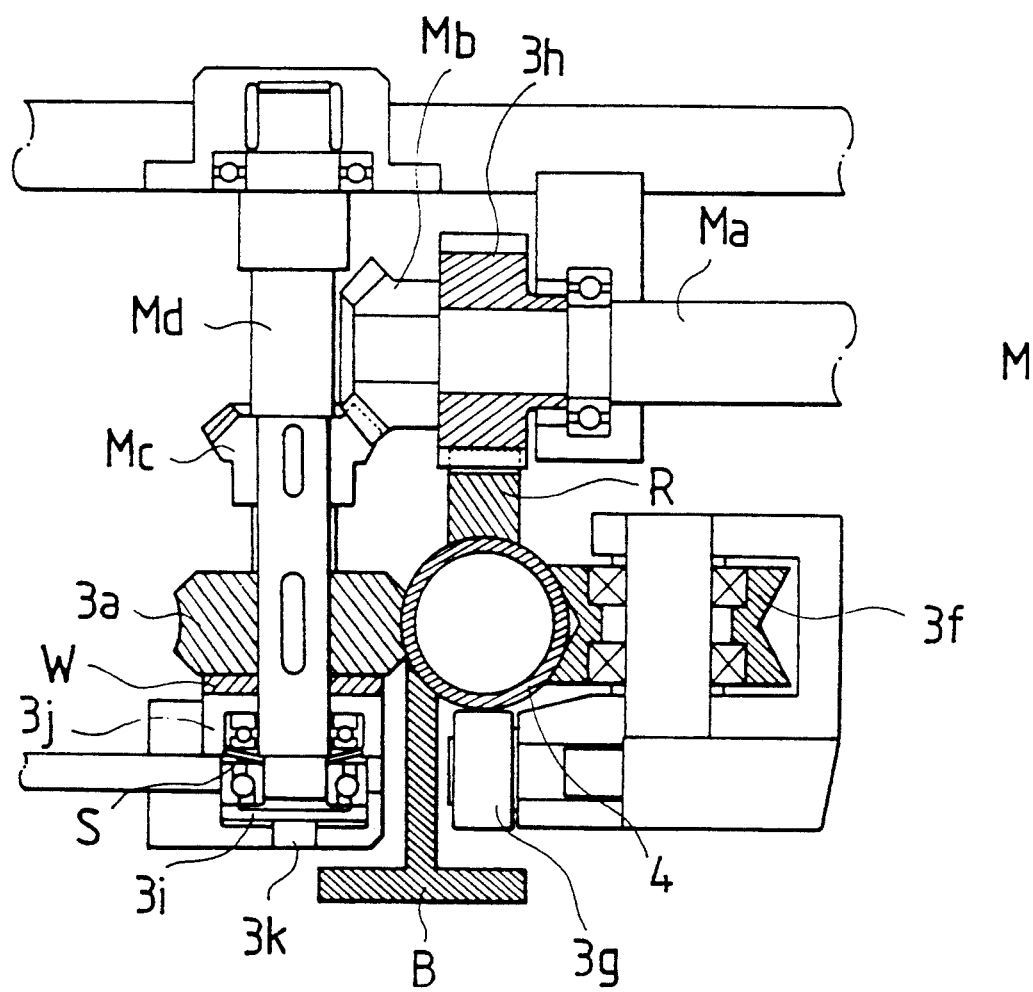
FIG. 3 is a sectional view of the mechanism related to the pipe rail of the present invention.
Figure 4:
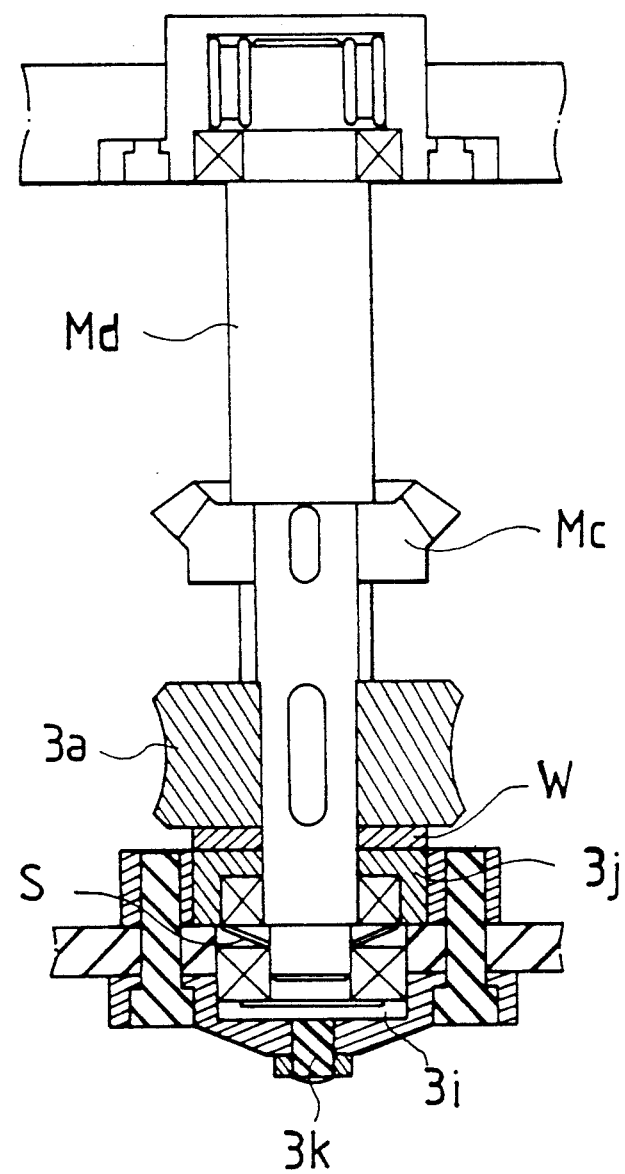
FIG. 4 is an enlarged sectional view of a part of the mechanism of FIG. 3.
Figure 5:
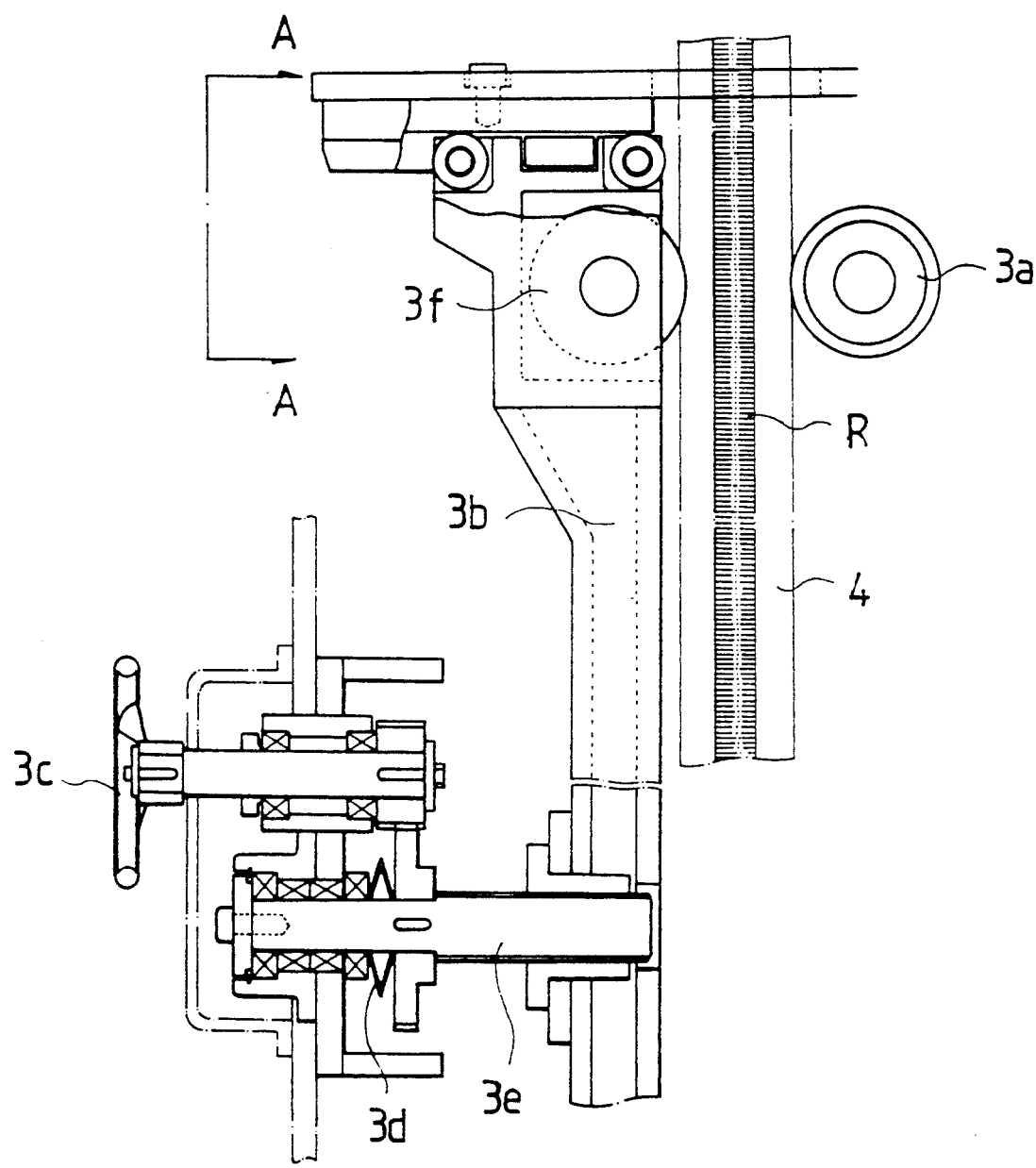
FIG. 5 is a sectional view of a carriage clamping roller.
Figure 6:
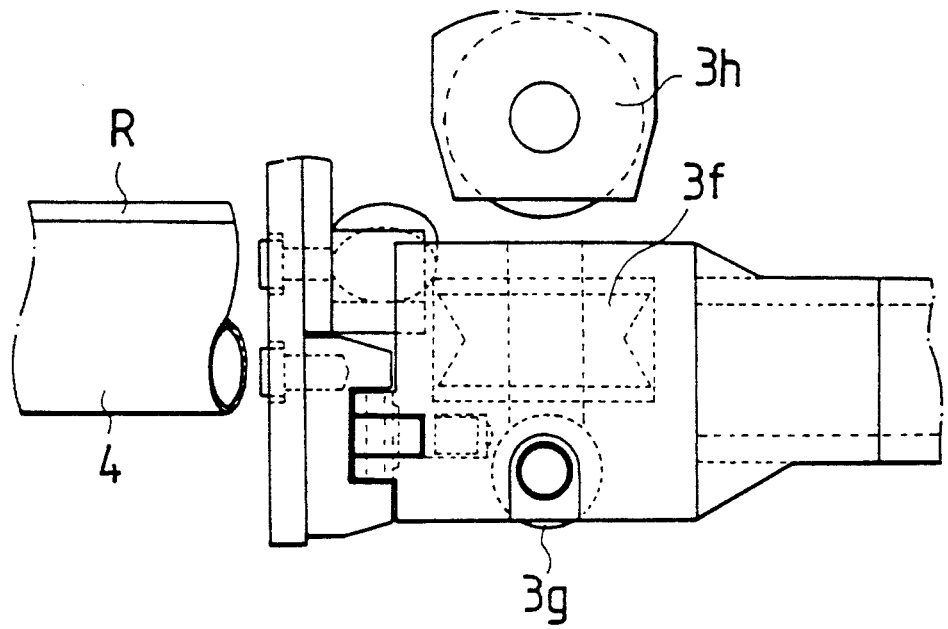
FIG. 6 is a sectional view taken along the line A—A of FIG. 5.

As shown in FIG. 2, the carriage 3 mounts a control box 9 which is capable of controlling a wire supply device 6, a wire winding part 7, and a welding device 8. During the welding, the carriage 3 rides on the pipe rail 4 at a pre-set speed, the pipe rail 4 being installed in parallel with the welding lines.

The overall welding process is performed as described below. That is, as shown in FIG. 1, the segments to be welded to form a ball tank are placed on a welding jig J, and the pipe rail 4 which has the same radius of curvature as that of the welding segments is installed in parallel with a welding line. The carriage 3 is mounted on the pipe rail 4, and a ladder 10 is placed at the left side of the welding line. A welding person climbs on the ladder 10 to observe the welding portions and to operate the welding apparatus, while the fixedly installed devices such as the power source 1 and the cooling water pump 2 are placed on the jig J or on the ground. The carriage 3 is moved to the lowermost point of the welding line, and the welding is carried out starting from a lowermost piece 11 to an uppermost piece 12.

When the welding operation is completed for one welding line, the carriage 3 and the pipe rail 4 are disassembled by following a procedure reverse to the assembling procedure, and then, another round of welding is carried out.

If the automatic MIG welding apparatus is used to weld an aluminum ball tank of an LNG vessel, the welding productivity and the welding quality are improved, as well as saving the welding cost. The welding apparatus according to the present invention is capable of welding along the longitudinal lines and lateral lines of the ball tank, and on the concave and convex surfaces of the ball tank. Further the welding can be performed with all kind of postures.

The installation and driving of the carriage 3 will be described below. That is, as shown in FIGS. 3 to 7, the pipe rail 4 is used in the form of a simple pipe rail or with a rack R attached thereon, and the pipe rail 4 is clamped by a driving roller 3a and a clamping roller 3f which are interlocked to a shaft Ma and a motor M. If a shaft plate 3b is moved back and forth by manipulating a handle 3c, the clamping roller 3f which is threadably coupled with a push rod 3e (which is elastically supported by a spring 3d) presses the driving roller 3a and a side of the pipe rail 4 to clamp it. Therefore, even if the outside diameter of the pipe rail 4 is varied within the tolerance, the clamping is maintained always in the range of 100-300 kg.

Under this condition, the tiny deviations which are produced by the curve of the rail is absorbed by a plate spring 3d.

Figure 7:
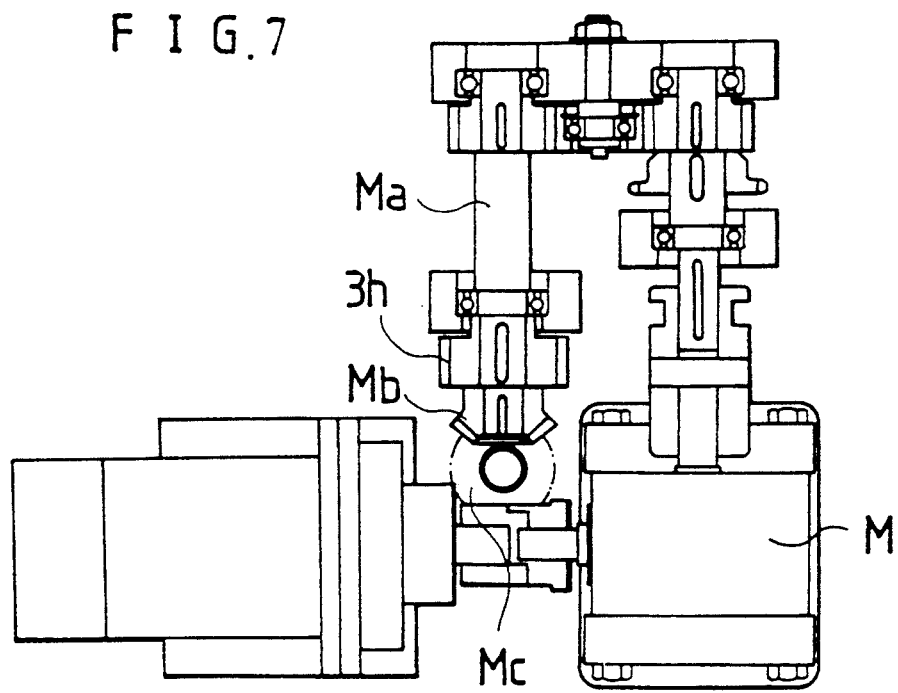
FIG. 7 illustrates the constitution of a longitudinal carriage driving system.

A backup roller 3g is installed at the opposite side of the rack R, and a pinion gear 3h is coupled with the rack R, so that the pinion gear 3h should be interlocked with the motor M through a shaft Ma as shown in FIG. 7.

When a pipe rail without the rack R is used, only the driving roller 3a exerts the driving power.

Figure 8:
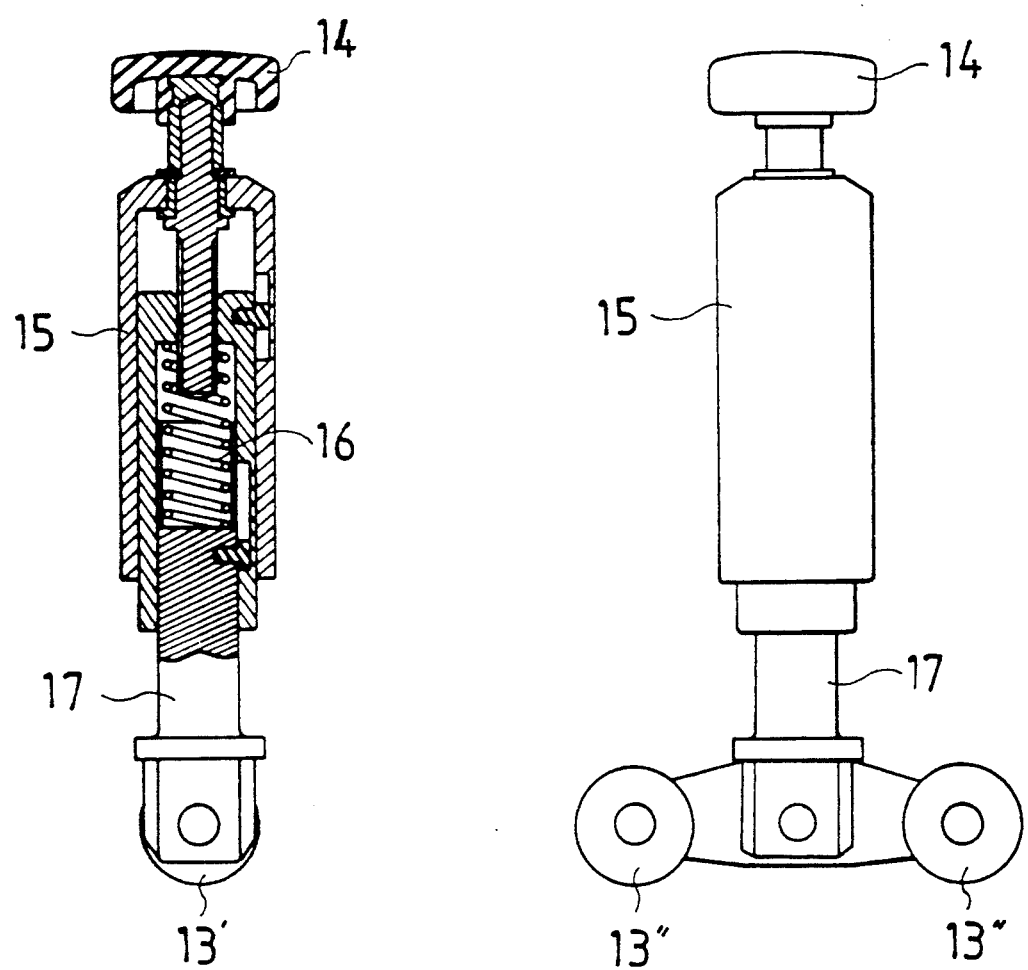
FIG. 8 is a sectional view of a carriage balancing unit.

In order to maintain a balance on the carriage 3 over the surface of the ball tank, a pair of height adjustable balancing rollers 13 and 13' are installed at each side of the carriage 3, so that all the welding lines can be welded by using a single bracket B during the welding of the lateral welding lines. However, the length of the arms of the balancing rollers 13 and 13' are required to be varied during the welding on the convex and concave surfaces of the ball tank. For this, two balancing rollers 13', or one balancing roller 13" with two rollers attached thereon, can be used. Further, as shown in FIG. 8, left and right balancing rollers 13 and 13', and 13 and 13' are attached on the tip of a screw slider 17 which is elastically supported by a spring 16 within a cylinder 15 which is moved back and forth by a handle 14. Thus the height of these balancing rollers can be adjusted, thereby adjusting the balance of the carriage 3 over the ball tank.

If tolerant welding deviations (curvature) and tolerant rail attachment deviations (height), which are liable to occur during the assembling process of the ball tank, actually occur, the welding electrode cannot always contact with the surface of the ball tank only by adjusting the height of the balancing rollers 13 in accordance with the screw adjusting method.

Therefore, a spring 16 is installed within the cylinder 15 which has the two balancing rollers 13' or the balancing roller 13" on the tip thereof, so that the height differences between the surface of the ball tank and the carriage 3 should be smoothly absorbed, and that the height of the carriage 3 should be automatically adjusted by the force of the spring 16.

Thus balancing rollers 13' and 13" having a stroke of ±17 mm are installed at the opposite side of the welding torch 8, and a screw-adjustable balancing roller 13 is installed at the side of the welding device 8.

The balancing rollers 13, 13' and 13" combinedly have strokes which are automatically adjusted by the elastic force of the spring 16, and strokes which are adjusted by the screw. The reason for providing such combined strokes is for ensuring that the rotating moment of the apparatus occurring during the welding of an upward sloped portion should be born by the screw-adjustable balancing rollers 13, 13' and 13".

In the apparatus of the present invention constituted as described above, the welding can be preformed with all kinds of welding postures. The carriage 3 is mounted on the pipe rail 4 which has a circular cross section, and therefore, the pipe rail 4 can be installed both on the longitudinal and lateral welding lines, while the process for installing it is simple to carry out.

However, with a lateral welding posture, the pipe rail 4 does not have the rack R, and, in order for the carriage 3 to run along the pipe rail 4, the power of the motor M has to be transmitted through the shaft Ma, bevel gears Mb and Mc, and the shaft Md to the driving roller 3a. Further the clamping roller 3f and the driving roller 3a clamp the pipe rail 4 so as for the power to be efficiently transmitted. However, in the process of transmitting the power through a number of gears, there occurs a backlash caused by the machining tolerances of the components, with the result that the revolution rpm of the motor M and the running speed of the carriage 3 do not correspond with each other.

That is, during the initial stage, the rpm of the motor M is constant, but the running speed of the carriage 3 varies. Further, if the surface of the rail 4 has undulations, speed variations occur during the running. Therefore, if the pressing adjustment bolt is tightened, a bearing pressing plate 3i pushes the plate spring S, so that the driving roller 3a should adjust the friction resistance between a bearing case 3j and a washer W, and the friction resistance between the washer W and the driving roller 3a. Consequently, there can be inhibited the speed variations of the carriage 3, which are caused by the external force which is defined to be "the over-running force occurring owing to the self gravity and inertia of the carriage 3 on a downward slope". This makes the running of the carriage 3 stable.

In the case of an upward posture, the total weight of the carriage 3 and the cables/hoses 5 acts on the pipe rail 4 downwardly, and therefore, there can occur slips between the pipe rail 4 and the driving roller 3a, with the result that there can be imposed a safety problem.

However, in the present invention, in order to utilize the advantage of the pipe rail 4 and to assure the running safety during an upward welding, the carriage 3 is provided with a pinion gear 3h which is driven by the motor M, while the pipe rail 4 is provided with a rack gear R which is projected by about 20 mm. Thus, during an upward welding, the carriage 3 receives the driving power from the rack and pinion, thereby eliminating the safety problem and the welding instability. When the carriage runs along a lateral pipe rail 4 having no rack R, the pinion gear 3h of the carriage 3 is put to an idle state, thereby excluding interferences.

Further, during a lateral welding, the carriage 3 is clamped to the pipe rail 4 by the fixed driving roller 3a and the laterally movable clamping roller 3f, thereby clamping the carriage 3 from the both sides. In this clamped state, the carriage 3 is driven along the pipe rail 4, with the driving roller 3a being strongly driven by the motor M. However, the outside diameter of the pipe rail 4 includes the manufacturing tolerance, and therefore, the friction resistance is not always constant, with the result that the running speed is not always constant.

In order to compensate this, a plate spring 3d having a spring constant of 100 kg/mm is installed so that a clamping force of over 100 kg should be maintained even if the outside diameter of the pipe rail 4 varies by ±1 mm.

Meanwhile, as the wire protecting apparatus, a case 19 and a cover 20 are installed in such a manner as to accommodate a known wire spool 18 which is installed on the carriage 3 through a shaft. Further an electric heater 21 is installed on a part of the case 19, thereby protecting the wire spool 18 physically from the external air. Thus the accumulation of foreign materials on the wire is prevented, and the internal temperature of the case 19 is maintained above the ambient temperature by 20°-30° C., so that the formation of dew on the wire should be prevented, thereby contributing to improving the welding quality.

Thus, the welding on a ball tank, which is a difficult task, can be performed in an easy manner, and consequently, the shortening of the construction period, the saving of the manufacturing cost and a quality improvement can be achieved.

Now the automatic milling apparatus according to the present invention will be described.

Figure 9:
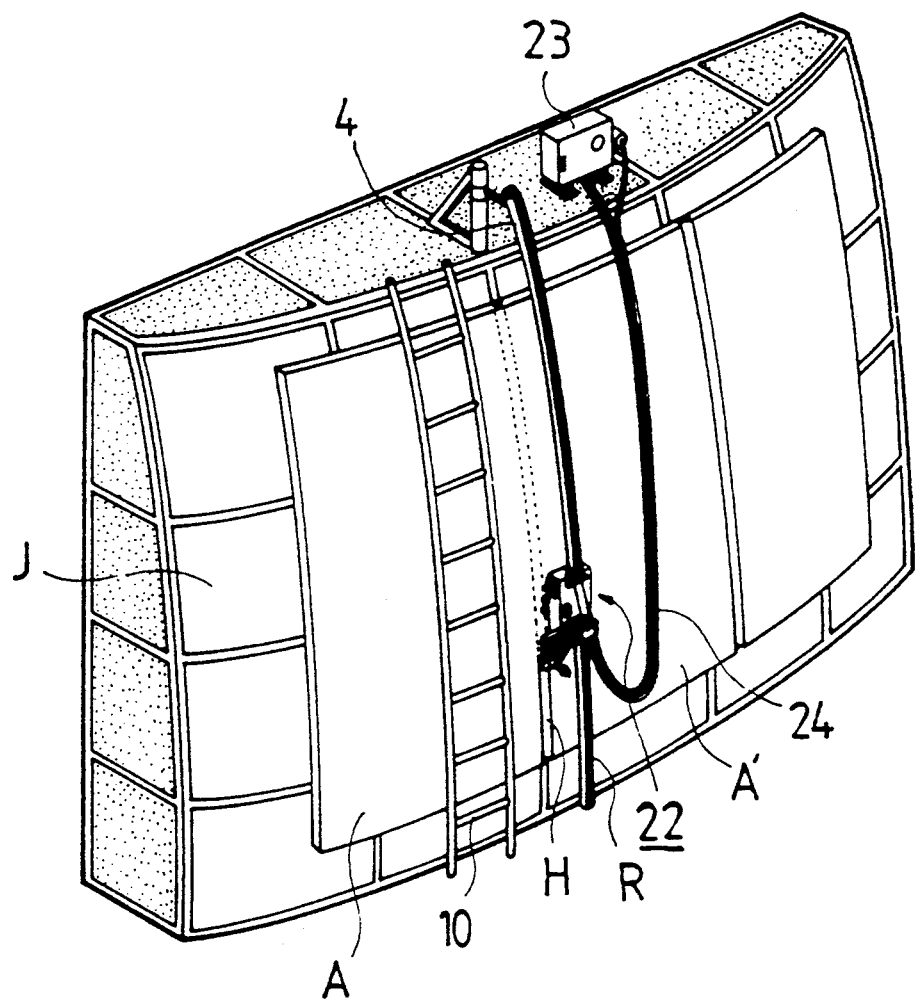
FIG. 9 is a perspective view showing the welding process of the automatic milling apparatus according to the present invention.

An example of the milling apparatus is illustrated in FIG. 9, and the welding and milling state is illustrated in FIG. 12.

Two pieces A and A' to be welded are placed properly, and a rail 4 and a ladder 10 are installed in parallel with the front welding lines. Then the carriage 3 of an MIG welding apparatus is installed on the rail 4, and then a front welding is carried out.

Then the rail 4 and the ladder 10 are installed in parallel with the rear welding lines, and the rear welding grooves H are formed. In machining the rear welding grooves, their shape and length are determined such that the imperfect projections formed during the front welding should all be removed, and that the rear welding can be carried out in a perfect manner.

Then a carriage 22 of the automatic milling apparatus which is installed on the rail 4 is detached from the rail 4. Then the carriage 3 for the MIG welding apparatus is movably installed on the rail 4, and then, a rear welding is carried out along the rear welding grooves H.

Figure 10:
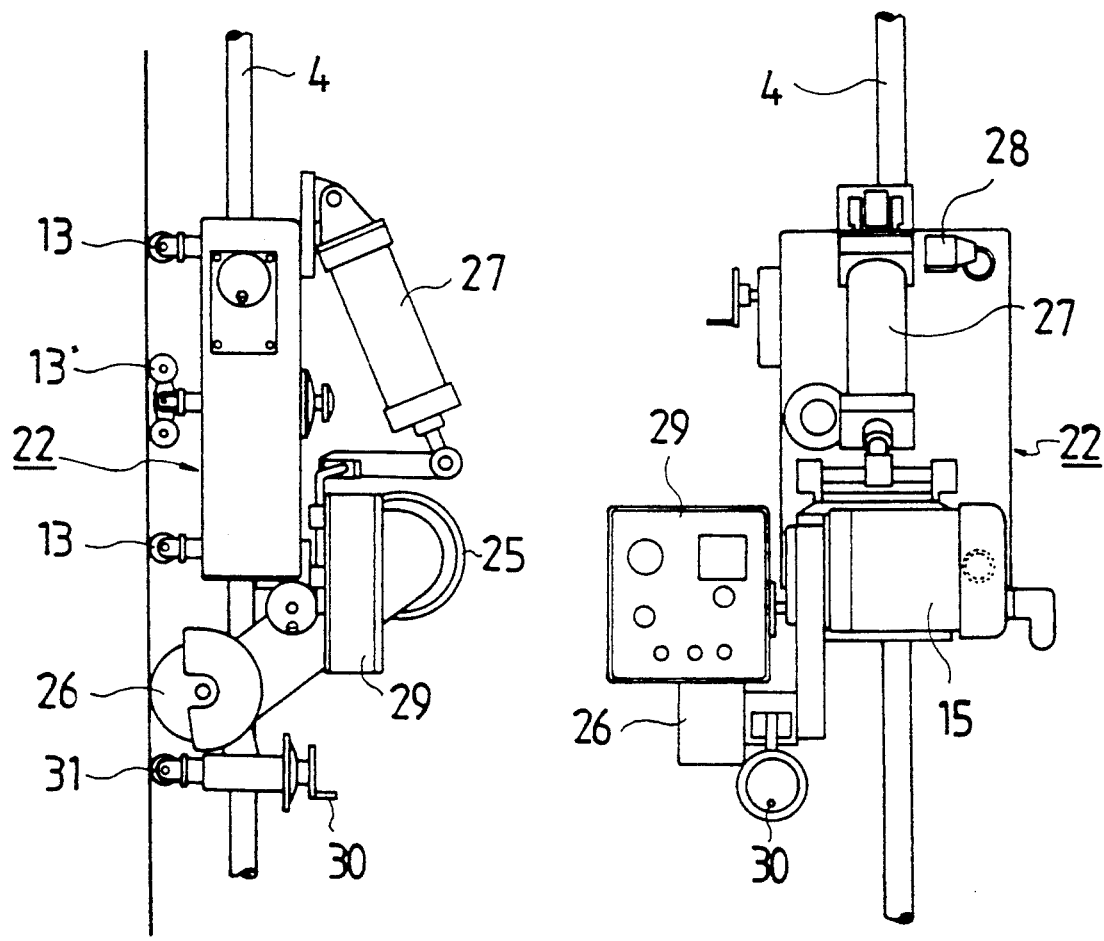
FIG. 10 illustrates the constitution of the automatic milling apparatus according to the present invention.
Figure 11:
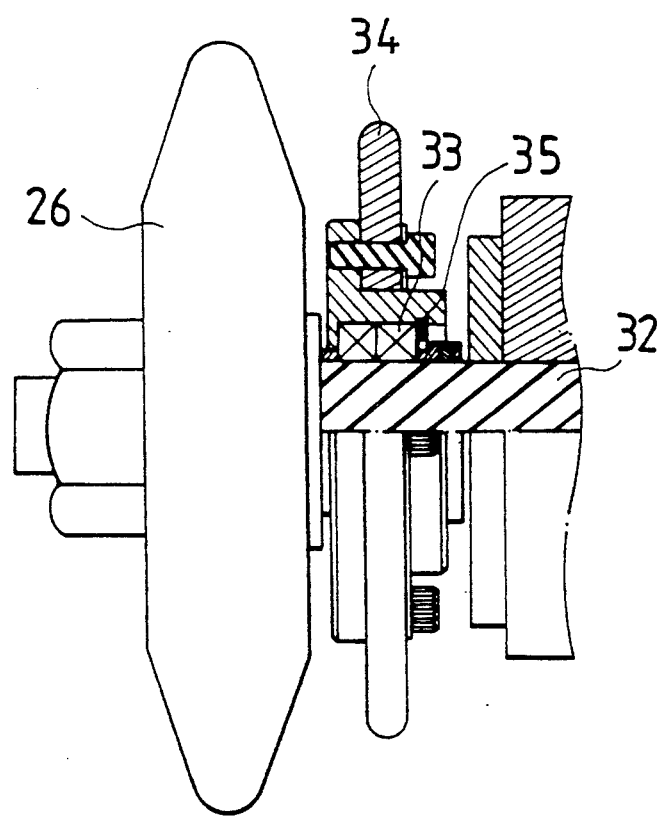
FIG. 11 is an enlarged illustration of a part of the automatic milling apparatus of FIG. 10.

The automatic milling apparatus which constitutes one of the subjects of the present invention is illustrated in FIGS. 10 and 11. As shown in these drawings, the milling apparatus includes a control box 23, a carriage 22, a pipe rail 4 in the form of a simple pipe rail or with a rack attached thereon, various tables, and an air hose 24.

The milling apparatus carriage 22 includes a milling motor 25, a cutter 26, a pneumatic cylinder 27, a solenoidal valve 28, a meter box 29 for adjusting various functions, and a remote control box (not shown).

The milling apparatus is installed upon the pipe rail to move on the rail at a constant speed, and to form automatically milled rear side welding grooves. Further, a guide roller 31 with a handle 30 attached thereon is installed in order to keep the depth of the grooves at a constant dimension. Further, on a shaft 32 of the milling cutter, there are installed a bearing 33, an idling type nylon guide roller 34, and a milling cutter guide roller having a stopper 35.

In order to adjust the distance between the level of the rail and the grooves, and to adjust the deviations of the depth of the grooves caused by the deviations of the three-dimensional curvature, a primary adjustment is carried out by the pneumatic cylinder 27, and secondarily, the guide roller 31 is adjusted up and down by turning the handle 30.

However, the deviations of the distance between the guide roller 31 (having the handle 30) and the cutter 26, and the deviations of the depth of the grooves due to the deviations of the three-dimensional curvature, can still occur. In order to eliminate such deviations, an idling type nylon guide roller 34 is installed on the cutter 26 and the shaft 32 in a close contact with the cutter 26, so that the guide roller should advance in parallel with the cutter 26 to eliminate the machining inaccuracies. The idling type nylon guide roller 34 can be replaced in accordance with the depth of the grooves with a smooth compatibility, thereby making it possible to reduce the machining inaccuracies of the welding grooves to the minimum.

According to the present invention, the automatic three-dimensional welding apparatus and the automatic groove forming milling apparatus are combined, thereby improving the welding efficiency and the welding quality.

What is claimed is:

1. An automatic MIG welding apparatus, comprising:
   a jig corresponding to a shape of a workpiece to be welded;
   a pipe rail disposed adjacent to a work surface of said jig;
   a carriage movably disposed upon said pipe rail, said carriage including a wire supplying device having a wire spool enclosed in a case and a cover, with an electric heater also disposed therein, said carriage also including welding means for welding a workpiece, and a control box for controlling said wire supplying device and said welding means;
   said apparatus also comprising a power source and a cooling water pump disposed on said jig, said power source and said cooling water pump being connected to said carriage by cable means, said power source for supplying power to said welding means, said wire spool, and said heater;
   wherein said workpiece is disposed on said work surface of said jig, and said carriage moves along said pipe rail such that said welding means welds seams of the workpiece.

2. An automatic MIG welding apparatus as recited in claim 1, said carriage further comprising
   a motor for moving said carriage along said pipe rail, and a driving roller coupled to said motor and engaging said pipe rail for moving said carriage therealong, and a clamping roller for clampingly engaging said pipe rail and ensuring positive engagement therewith.

3. An automatic MIG welding apparatus as recited in claim 2, wherein said driving roller is coupled to said motor through a shaft and a gear arrangement.

4. An automatic MIG welding apparatus as recited in claim 2, further comprising adjusting means for adjusting a friction resistance of said driving roller, said adjusting means comprising an adjusting bolt, a bearing case engaging said adjusting bolt, and a washer adjacent said bearing case, such that a movement of the adjusting bolt adjusts a friction resistance between the bearing case and the washer, thereby adjusting the friction resistance of the driving roller.

5. An automatic MIG welding apparatus as recited in claim 2, further comprising a pinion gear coupled to said motor, said pinion gear engaging with said rail.

6. An automatic MIG welding apparatus as recited in claim 1, said carriage further comprising at least two balancing rollers on opposite sides of said carriage means, said balancing rollers elastically coupled to said carriage means by a slider means which urges respective balancing rollers toward a surface of said workpiece.

7. An automatic MIG welding apparatus as recited in claim 6, wherein said clamping roller elastically engages said pipe rail through elastic engagement with a push rod and a plate spring.

8. An automatic MIG welding apparatus as recited in claim 1, further comprising a rack disposed on said pipe rail for engaging with said carriage.

* * * * *